United States Patent
Struhsaker et al.

(10) Patent No.: US 7,099,383 B2
(45) Date of Patent: Aug. 29, 2006

(54) APPARATUS AND ASSOCIATED METHOD FOR OPERATING UPON DATA SIGNALS RECEIVED AT A RECEIVING STATION OF A FIXED WIRELESS ACCESS COMMUNICATION SYSTEM

(75) Inventors: Paul F. Struhsaker, Plano, TX (US); Russell C. McKown, Richardson, TX (US)

(73) Assignee: Raze Technologies, Inc., Plano, TX (US)

( * ) Notice: Subject to any disclaimer, the term of this patent is extended or adjusted under 35 U.S.C. 154(b) by 685 days.

(21) Appl. No.: 09/839,726

(22) Filed: Apr. 20, 2001

(65) Prior Publication Data

US 2002/0097793 A1 Jul. 25, 2002

Related U.S. Application Data

(60) Provisional application No. 60/262,825, filed on Jan. 19, 2001.

(51) Int. Cl.
*H04B 1/38* (2006.01)
*H04L 5/16* (2006.01)

(52) U.S. Cl. .......................... 375/222; 375/219; 710/1; 379/90.01; 455/21; 455/293; 455/312; 455/337

(58) Field of Classification Search ................ 375/222, 375/219; 455/33.3, 101, 69, 21, 293, 312, 455/337; 379/90.01; 710/1
See application file for complete search history.

(56) References Cited

U.S. PATENT DOCUMENTS

| 5,440,589 | A | | 8/1995 | Kaku et al. .................. 375/344 |
|---|---|---|---|---|
| 5,625,876 | A | * | 4/1997 | Gilhousen et al. .......... 370/331 |
| 5,638,371 | A | | 6/1997 | Raychaudhuri et al. ..... 370/347 |
| 5,684,791 | A | | 11/1997 | Raychaudhuri et al. ..... 370/278 |
| 5,694,424 | A | | 12/1997 | Ariyavisitakul .............. 375/233 |
| 5,809,086 | A | | 9/1998 | Ariyavisitakul .............. 375/332 |
| 5,940,454 | A | * | 8/1999 | McNicol et al. ............. 375/347 |
| 5,953,676 | A | * | 9/1999 | Berry et al. ................. 455/564 |
| 5,991,292 | A | | 11/1999 | Focsaneanu et al. ........ 370/352 |
| 6,011,785 | A | * | 1/2000 | Carney et al. ............... 370/330 |
| 6,016,313 | A | * | 1/2000 | Foster et al. ................. 370/330 |
| 6,131,016 | A | * | 10/2000 | Greenstein et al. ........... 455/69 |
| 6,188,873 | B1 | | 2/2001 | Wickman et al. ........... 455/11.1 |
| 6,272,333 | B1 | * | 8/2001 | Smith ......................... 455/418 |
| 6,393,290 | B1 | * | 5/2002 | Ufongene .................... 455/446 |
| 6,463,290 | B1 | * | 10/2002 | Stilp et al. ................ 455/456.1 |
| 6,553,209 | B1 | * | 4/2003 | Hornsby et al. ............... 455/76 |
| 6,650,649 | B1 | * | 11/2003 | Muhammad et al. ........ 370/402 |
| 6,657,983 | B1 | * | 12/2003 | Surazski et al. ............. 370/337 |
| 6,735,630 | B1 | * | 5/2004 | Gelvin et al. ................ 709/224 |
| 2002/0036985 | A1 | * | 3/2002 | Jonas et al. .................. 370/235 |
| 2002/0115421 | A1 | * | 8/2002 | Shahar et al. ................ 455/403 |

FOREIGN PATENT DOCUMENTS

| EP | 792030 A2 * | 8/1997 |
|---|---|---|
| EP | 0890271 | 1/1999 |
| GB | 2320991 | 7/1998 |
| WO | WO 95/12296 | 5/1995 |
| WO | WO 00/28753 | 5/2000 |

* cited by examiner

*Primary Examiner*—Jean B. Corrielus
*Assistant Examiner*—Erin M. File

(57) ABSTRACT

Apparatus, and an associated method, for acting upon data signals received at a base station of a fixed wireless access communication system. A plurality of modems are positioned at the base station, and a controller controls to which modem that a data signal, transmitted by a particular subscriber station, is applied to a particular modem. Profiles relating to channel and signal characteristics are also maintained and used by the modem during demodulation operations.

17 Claims, 4 Drawing Sheets

APPARATUS AND ASSOCIATED METHOD FOR OPERATING UPON DATA SIGNALS RECEIVED AT A RECEIVING STATION OF A FIXED WIRELESS ACCESS COMMUNICATION SYSTEM

The present invention claims priority to U.S. Provisional Application Ser. No. 60/262,825 filed Jan. 19, 2001.

CROSS-REFERENCE TO RELATED APPLICATIONS

The present invention is related to those disclosed in the following United States Provisional and Non-Provisional Patent Applications:

1) Ser. No. 09/713,684, filed on Nov. 15, 2000, entitled "SUBSCRIBER INTEGRATED ACCESS DEVICE FOR USE IN WIRELESS AND WIRELINE ACCESS SYSTEMS";
2) Ser. No. 09/838,810, filed Apr. 20, 2001, entitled "WIRELESS COMMUNICATION SYSTEM USING BLOCK FILTERING AND FAST EQUALIZATION-DEMODULATION AND METHOD OF OPERATION" (60/262,712);
3) Ser. No. 09/839,729, filed Apr. 20, 2001, entitled "APPARATUS AND METHOD FOR OPERATING A SUBSCRIBER INTERFACE IN A FIXED WIRELESS SYSTEM" (60/262,698);
4) Ser. No. 09/839,719, filed Apr. 20, 2001, entitled "APPARATUS AND METHOD FOR CREATING SIGNAL AND PROFILES AT A RECEIVING STATION" (60/262,827);
5) Ser. No. 09/838,910, filed Apr. 20, 2001, entitled "SYSTEM AND METHOD FOR INTERFACE BETWEEN A SUBSCRIBER MODEM AND SUBSCRIBER PREMISES INTERFACES" (60/262,826);
6) Ser. No. 09/839,509, filed Apr. 20, 2001, entitled "BACKPLANE ARCHITECTURE FOR USE IN WIRELESS AND WIRELINE ACCESS SYSTEMS" (60/262,951);
7) Ser. No. 09/839,514, filed Apr. 20, 2001, entitled "SYSTEM AND METHOD FOR ON-LINE INSERTION OF LINE REPLACEABLE UNITS IN WIRELESS AND WIRELINE ACCESS SYSTEMS" (60/262,824);
8) Ser. No. 09/839,512, filed Apr. 20, 2001, entitled "SYSTEM FOR COORDINATION OF TDD TRANSMISSION BURSTS WITHIN AND BETWEEN CELLS IN A WIRELESS ACCESS SYSTEM AND METHOD OF OPERATION" (60/263,101);
9) Ser. No. 09/839,259, filed Apr. 20, 2001, entitled "REDUNDANT TELECOMMUNICATION SYSTEM USING MEMORY EQUALIZATION APPARATUS AND METHOD OF OPERATION" (60/263,097);
10) Ser. No. 09/839,457, filed Apr. 20, 2001, entitled "WIRELESS ACCESS SYSTEM FOR ALLOCATING AND SYNCHRONIZING UPLINK AND DOWNLINK OF TDD FRAMES AND METHOD OF OPERATION" (60/273,579);
11) Ser. No. 09/839,075, filed Apr. 20, 2001, entitled "TDD FDD AIR INTERFACE" (60/262,955);
12) Ser. No. 09/839,499, filed Apr. 20, 2001, entitled "APPARATUS, AND AN ASSOCIATED METHOD, FOR PROVIDING WLAN SERVICE IN A FIXED WIRELESS ACCESS COMMUNICATION SYSTEM" (60/262,708);
13) Ser. No. 09/839,458, filed Apr. 20, 2001, entitled "WIRELESS ACCESS SYSTEM USING MULTIPLE MODULATION" (60/273,689);
14) Ser. No. 09/839,456, filed Apr. 20, 2001, entitled "WIRELESS ACCESS SYSTEM AND ASSOCIATED METHOD USING MULTIPLE MODULATION FORMATS IN TDD FRAMES ACCORDING TO SUBSCRIBER SERVICE TYPE" (60/273,757);
15) Ser. No. 09/838,924, filed Apr. 20, 2001, entitled "APPARATUS FOR ESTABLISHING A PRIORITY CALL IN A FIXED WIRELESS ACCESS COMMUNICATION SYSTEM" (60/270,378);
16) Ser. No. 09/839,727, filed Apr. 20, 2001, entitled "APPARATUS FOR REALLOCATING COMMUNICATION RESOURCES TO ESTABLISH A PRIORITY CALL IN A FIXED WIRELESS ACCESS COMMUNICATION SYSTEM" (60/270,385);
17) Ser. No. 09/839,734, filed Apr. 20, 2001, entitled "METHOD FOR ESTABLISHING A PRIORITY CALL IN A FIXED WIRELESS ACCESS COMMUNICATION SYSTEM" (60/270,430);
18) Ser. No. 09/839,513, filed Apr. 20, 2001, entitled "SYSTEM AND METHOD FOR PROVIDING AN IMPROVED COMMON CONTROL BUS FOR USE IN ON-LINE INSERTION OF LINE REPLACEABLE UNITS IN WIRELESS AND WIRELINE ACCESS SYSTEMS" (09/839,513);
19) Ser. No. 60/262,712, filed on Jan. 19, 2001, entitled "WIRELESS COMMUNICATION SYSTEM USING BLOCK FILTERING AND FAST EQUALIZATION-DEMODULATION AND METHOD OF OPERATION";
20) Ser. No. 60/262,698, filed on Jan. 19, 2001, entitled "APPARATUS AND METHOD FOR OPERATING A SUBSCRIBER INTERFACE IN A FIXED WIRELESS SYSTEM";
21) Ser. No. 60/262,827, filed on Jan. 19, 2001, entitled "APPARATUS AND METHOD FOR CREATING SIGNAL AND PROFILES AT A RECEIVING STATION";
22) Ser. No. 60/262,826, filed on Jan. 19, 2001, entitled "SYSTEM AND METHOD FOR INTERFACE BETWEEN A SUBSCRIBER MODEM AND SUBSCRIBER PREMISES INTERFACES";
23) Ser. No. 60/262,951, filed on Jan. 19, 2001, entitled "BACKPLANE ARCHITECTURE FOR USE IN WIRELESS AND WIRELINE ACCESS SYSTEMS";
24) Ser. No. 60/262,824, filed on Jan. 19, 2001, entitled "SYSTEM AND METHOD FOR ON-LINE INSERTION OF LINE REPLACEABLE UNITS IN WIRELESS AND WIRELINE ACCESS SYSTEMS";
25) Ser. No. 60/263,101, filed on Jan. 19, 2001, entitled "SYSTEM FOR COORDINATION OF TDD TRANSMISSION BURSTS WITHIN AND BETWEEN CELLS IN A WIRELESS ACCESS SYSTEM AND METHOD OF OPERATION";
26) Ser. No. 60/263,097, filed on Jan. 19, 2001, entitled "REDUNDANT TELECOMMUNICATION SYSTEM USING MEMORY EQUALIZATION APPARATUS AND METHOD OF OPERATION";
27) Ser. No. 60/273,579, filed Mar. 5, 2001, entitled "WIRELESS ACCESS SYSTEM FOR ALLOCATING AND SYNCHRONIZING UPLINK AND DOWNLINK OF TDD FRAMES AND METHOD OF OPERATION";
28) Ser. No. 60/262,955, filed Jan. 19, 2001, entitled "TDD FDD AIR INTERFACE";
29) Ser. No. 60/262,708, filed on Jan. 19, 2001, entitled "APPARATUS, AND AN ASSOCIATED METHOD, FOR PROVIDING WLAN SERVICE IN A FIXED WIRELESS ACCESS COMMUNICATION SYSTEM";

30) Ser. No. 60/273,689, filed Mar. 5, 2001, entitled "WIRELESS ACCESS SYSTEM USING MULTIPLE MODULATION";
31) Ser. No. 60/273,757, filed Mar. 5, 2001, entitled "WIRELESS ACCESS SYSTEM AND ASSOCIATED METHOD USING MULTIPLE MODULATION FORMATS IN TDD FRAMES ACCORDING TO SUBSCRIBER SERVICE TYPE";
32) Ser. No. 60/270,378, filed Feb. 21, 2001, entitled "APPARATUS FOR ESTABLISHING A PRIORITY CALL IN A FIXED WIRELESS ACCESS COMMUNICATION SYSTEM";
33) Ser. No. 60/270,385, filed Feb. 21, 2001, entitled "APPARATUS FOR REALLOCATING COMMUNICATION RESOURCES TO ESTABLISH A PRIORITY CALL IN A FIXED WIRELESS ACCESS COMMUNICATION SYSTEM"; and
34) Ser. No. 60/270,430, filed Feb. 21, 2001, entitled "METHOD FOR ESTABLISHING A PRIORITY CALL IN A FIXED WIRELESS ACCESS COMMUNICATION SYSTEM".

The above applications are commonly assigned to the assignee of the present invention. The disclosures of these related patent applications are hereby incorporated by reference for all purposes as if fully set forth herein.

TECHNICAL FIELD OF THE INVENTION

The present invention is directed, in general, to communication network access systems and, more specifically, to an apparatus for processing data signals received from wireless subscriber stations.

BACKGROUND OF THE INVENTION

Telecommunications access systems provide for voice, data, and multimedia transport and control between the central office (CO) of the telecommunications service provider and the subscriber (customer) premises. Prior to the mid-1970s, the subscriber was provided phone lines (e.g., voice frequency (VF) pairs) directly from the Class 5 switching equipment located in the central office of the telephone company. In the late 1970s, digital loop carrier (DLC) equipment was added to the telecommunications access architecture. The DLC equipment provided an analog phone interface, voice CODEC, digital data multiplexing, transmission interface, and control and alarm remotely from the central office to cabinets located within business and residential locations for approximately 100 to 2000 phone line interfaces. This distributed access architecture greatly reduced line lengths to the subscriber and resulted in significant savings in both wire installation and maintenance. The reduced line lengths also improved communication performance on the line provided to the subscriber.

By the late 1980s, the limitations of data modem connections over voice frequency (VF) pairs were becoming obvious to both subscribers and telecommunications service providers. ISDN (Integrated Services Digital Network) was introduced to provide universal 128 kbps service in the access network. The subscriber interface is based on 64 kbps digitization of the VF pair for digital multiplexing into high speed digital transmission streams (e.g., T1/T3 lines in North America, E1/E3 lines in Europe). ISDN was a logical extension of the digital network that had evolved throughout the 1980s. The rollout of ISDN in Europe was highly successful. However, the rollout in the United States was not successful, due in part to artificially high tariff costs which greatly inhibited the acceptance of ISDN.

More recently, the explosion of the Internet and deregulation of the telecommunications industry have brought about a broadband revolution characterized by greatly increased demands for both voice and data services and greatly reduced costs due to technological innovation and intense competition in the telecommunications marketplace. To meet these demands, high speed DSL (digital subscriber line) modems and cable modems have been developed and introduced. The DLC architecture was extended to provide remote distributed deployment at the neighborhood cabinet level using DSL access multiplexer (DSLAM) equipment. The increased data rates provided to the subscriber resulted in upgrade DLC/DSLAM transmission interfaces from T1/E1 interfaces (1.5/2.0 Mbps) to high speed DS3 and OC3 interfaces. In a similar fashion, the entire telecommunications network backbone has undergone and is undergoing continuous upgrade to wideband optical transmission and switching equipment.

Similarly, wireless access systems have been developed and deployed to provide broadband access to both commercial and residential subscriber premises. Initially, the market for wireless access systems was driven by rural radiotelephony deployed solely to meet the universal service requirements imposed by government (i.e., the local telephone company is required to serve all subscribers regardless of the cost to install service). The cost of providing a wired connection to a small percentage of rural subscribers was high enough to justify the development and expense of small-capacity wireless local loop (WLL) systems.

Deregulation of the local telephone market in the United States (e.g., Telecommunications Act of 1996) and in other countries shifted the focus of fixed wireless access (FWA) systems deployment from rural access to competitive local access in more urbanized areas. In addition, the age and inaccessibility of much of the older wired telephone infrastructure makes FWA systems a cost-effective alternative to installing new, wired infrastructure. Also, it is more economically feasible to install FWA systems in developing countries where the market penetration is limited (i.e., the number and density of users who can afford to pay for services is limited to small percent of the population) and the rollout of wired infrastructure cannot be performed profitably. In either case, broad acceptance of FWA systems requires that the voice and data quality of FWA systems must meet or exceed the performance of wired infrastructure.

Wireless access systems must address a number of unique operational and technical issues including:

1) Relatively high bit error rates (BER) compared to wire line or optical systems; and 2) Transparent operation with network protocols and protocol time constraints for the following protocols:
   a) ATM;
   b) Class 5 switch interfaces (domestic GR-303 and international V5.2);
   c) TCP/IP with quality-of-service QoS for voice over IP (VOIP) (i.e., RTP) and other H.323 media services;
   d) Distribution of synchronization of network time out to the subscribers;

3) Increased use of voice, video and/or media compression and concentration of active traffic over the air interface to conserve bandwidth;

4) Switching and routing within the access system to distribute signals from the central office to multiple remote cell sites containing multiple cell sectors and one or more frequencies of operation per sector; and 5) Remote support and debugging of the subscriber equipment, including remote software upgrade and provisioning.

Unlike physical optical or wire systems that operate at bit error rates (BER) of $10^{-11}$, wireless access systems have time varying channels that typically provide bit error rates of $10^{-3}$ to $10^{-6}$. The wireless physical (PHY) layer interface and the media access control (MAC) layer interface must provide modulation, error correction and ARQ protocol that can detect and, where required, correct or retransmit corrupted data so that the interfaces at the network and at the subscriber site operate at wire line bit error rates.

The wide range of equipment and technology capable of providing either wireline (i.e., cable, DSL, optical) broadband access or wireless broadband access has allowed service providers to match the needs of a subscriber with a suitable broadband access solution. However, in many areas, the cost of cable modem or DSL service is high. Additionally, data rates may be slow or coverage incomplete due to line lengths. In these areas and in areas where the high cost of replacing old telephone equipment or the low density of subscribers makes it economically unfeasible to introduce either DSL or cable modem broadband access, fixed wireless broadband systems offer a viable alternative. Fixed wireless broadband systems use a group of transceiver base stations to cover a region in the same manner as the base stations of a cellular phone system. The base stations of a fixed wireless broadband system transmit forward channel (i.e., downstream) signals in directed beams to fixed location antennas attached to the residences or offices of subscribers. The base stations also receive reverse channel (i.e., upstream) signals transmitted by the broadband access equipment of the subscriber.

Unfortunately, the diversity of broadband access technology has resulted in a lack of standardization in the broadband access equipment. Cable modems and DSL routers are incompatible with each other and with fiber optic equipment. Different service providers locate broadband access equipment in different locations on the subscriber premises. Often this equipment is located inside the office or residence of the subscriber, which makes it inaccessible to maintenance workers unless the subscriber is present to admit the workers to the premises. The lack of standardization of broadband access equipment and the frequent inaccessibility of such equipment adds to the cost and complexity of broadband access.

Therefore, there is a need in the art for broadband access equipment that can be readily and inexpensively deployed in the large domestic and international markets that are not currently served by wired or wireless broadband access technology. Further, there is a need for an apparatus to increase the communication capacity of the communication system.

The broadband access equipment includes base stations which have RF (radio frequency) modems capable of modulating and demodulating data signals communicated between the base stations and subscriber stations. A large number of subscriber stations are generally capable of communicating with a single base station.

The RF modems must be capable of communicating with the subscriber stations in manners which permit quick, and accurate, receive operations to be performed upon signals transmitted thereto by the subscriber stations.

Any manner by which to provide increased speed and accuracy of receive operations to be performed upon the signals transmitted to a base station of an FWA system would be advantageous.

SUMMARY OF THE INVENTION

The present invention, accordingly, advantageously provides apparatus, and an associated method, by which to operate upon data signals received at a receiving station, such as a base station of a fixed wireless access communication system.

During operation of an embodiment of the present invention, data signals are processed at a receiving station, such as a base station of fixed wireless access communication system. The data signals are transmitted to the receiving stations by any of a plurality of subscriber stations. Improved uplink capacity of data signals sent by the subscriber stations to the base station is possible as a result of operation of an embodiment of the present invention. Additionally, better compensation is made to counteract the effects of distortion of the data signals communicated during operation of a communication system in which an embodiment of the present invention is implemented.

In one aspect of the present invention, at least two demodulators (typically the demodulators are contained in radio frequency (RF) modems and demodulators and modems will be referred to interchangeably hereinafter) are provided at the receive portion of a base station of a fixed wireless access communication system, or other receiving station. The data signals communicated to the base station by subscriber stations, or other sending stations, are applied to the separate demodulators according to a selected pattern. When two demodulators are provided, successive bursts of data are applied, for instance to alternating ones of the demodulators. The demodulators form, for instance, the demodulator portions of modems.

In another aspect of the present invention, separate profiles are created and stored at the base station, are accessible thereto. The profiles profile the channels upon which bursts of data are transmitted by separate subscriber stations and also characteristics of the data transmitted by the separate subscriber stations. The profiles are updated, as appropriate, and include the information required of the demodulators to permit their operation to demodulate bursts of data applied thereto.

In another aspect of the present invention, cyclo-stationary filtering is performed upon the bursts of data provided to the demodulator portions of the modems. Each of the bursts of data transmitted to the base station by a subscriber station is considered to be a separate and distinct station channel environment. Each of the channels is processed by configuring the receive portion of the base station with a matched filter. The matched filter forms an equalizer, operable to equalize any of the separate and distinct stationary channels upon which the bursts of data are transmitted. The filter weights of the equalizer formed of the matched filter associated with each of the channels forms portions of the profiles which are stored and accessed during system operation.

The profiles further selectably include other parameters, such as the modulation index of the data signals communicated by the subscriber stations to the base station, the modulation orthogonalizations of the bursts of data signals of the bursts of data signals, parameters associated with FEC (forward error correction) of the data bursts sent to the base station by the subscriber stations, antenna combining parameters when antenna diversity is utilized, timing adjustment parameters, time and frequency changes of the signals, as well as other values.

When a burst of data is provided to a demodulator, a profile associated with the channel upon which the burst is communicated to the base station is retrieved and utilized in the demodulation of the burst of data. As the burst of data is demodulated, the values of the profile associated with the channel upon which the data burst is communicated are updated as appropriate. The updated profile is stored to be retrieved thereafter, when subsequent data bursts are received at the base station and demodulated at a demodulator thereof.

Thereby, through operation of an embodiment of the present invention improved uplink communication capacity as well as improved compensation for distortion of the data communicated to the base station is provided.

Elements of the profile created and stored during operation of an embodiment of the present invention are selected to be values pertinent to the implementation of the communication system. Upgrades, or other changes in the operation of the communication system, are readily implemented, as necessary, thereby to adapt operation of an embodiment of the present invention corresponding to the changes in operation of the communication system.

In one implementation, an embodiment of the present invention is implemented at the base station of a fixed wireless access communication system. Data bursts of data signals are communicated to the base station. The data bursts are generated by a plurality of subscriber stations positioned within the coverage area defined by the base station. Alternating ones of the bursts are provided to a pair of modems forming part of the receive portion of the base station. The modems are controlled by a controller, such as a base station central processing unit, to control demodulation operations thereat. The controller maintains profiles associated with the channels separate ones of the data bursts are communicated. The profiles are retrieved and values of the elements of such profiles are utilized in the demodulation of the respective data bursts.

In these and other aspects, therefore, apparatus and an associated method, is provided for a communication station operable in a wireless communication system, at least to receive first data signals transmitted thereto by a first subscriber station and at least second data signals transmitted thereto by at least a second subscriber station. A first demodulator is selectably coupled to receive at least one of the first and second data signals transmitted to the communication station by the first and second subscriber stations. A controller is coupled to the first demodulator and to the at least second demodulator in a feedback arrangement. The controller selects which of the first and second data signals, respectively, are applied to the first demodulator. And, the controller selects which of the first and second data signals, respectively, are applied to the second demodulator.

The present invention will be better understood when read in light of the accompanying drawings which are described in the detailed description hereinbelow and in light of the claims appended hereto.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 4, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged subscriber integrated access device.

Figure 1:
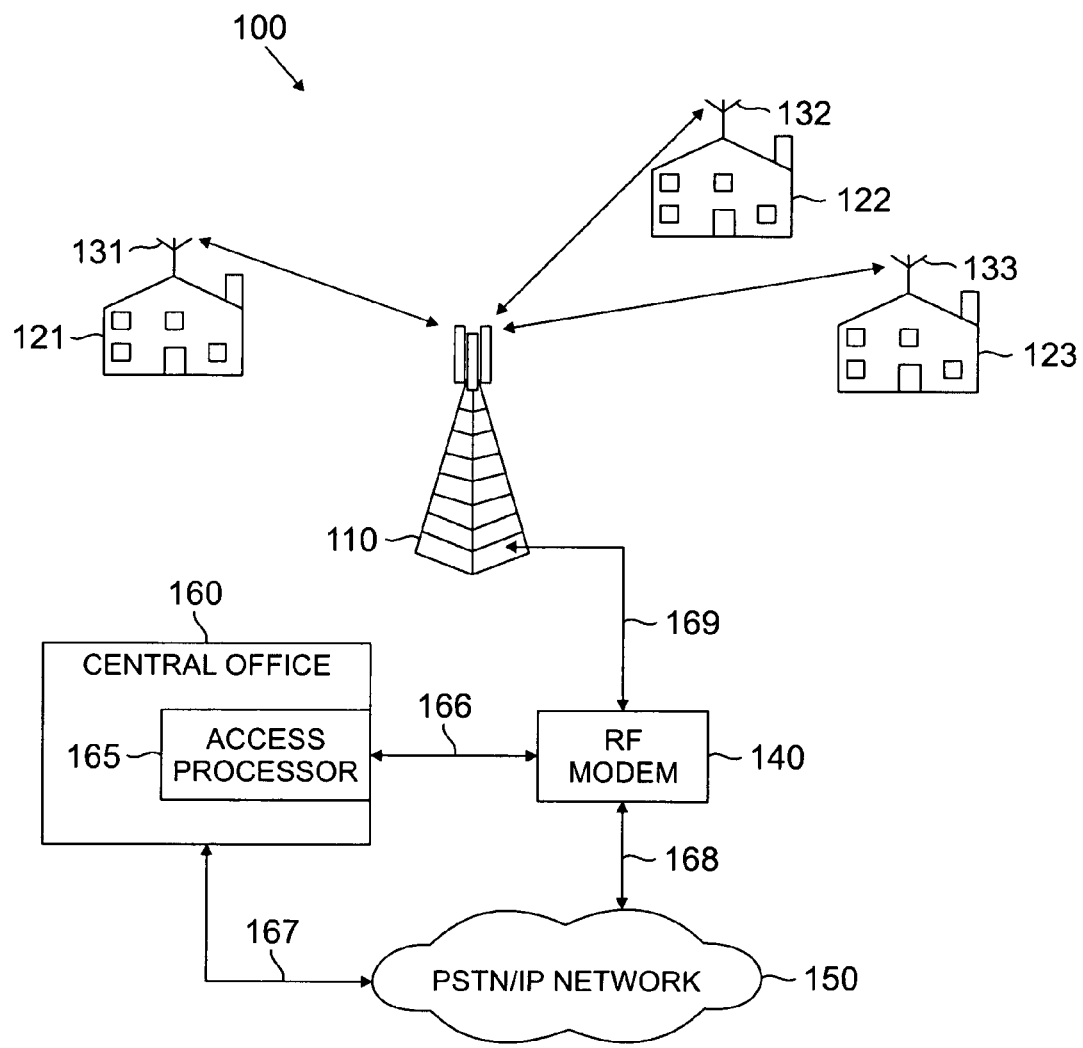
FIG. 1 illustrates an exemplary fixed wireless access network according to an embodiment of the present invention.

FIG. 1 illustrates exemplary fixed wireless access network 100 according to one embodiment of the present invention. Fixed wireless network 100 comprises a plurality of transceiver base stations, including exemplary transceiver base station 110, that transmit forward channel (i.e., downlink or downstream) broadband signals to a plurality of subscriber premises, including exemplary subscriber premises 121, 122 and 123, and receive reverse channel (i.e., uplink or upstream) broadband signals from the plurality of subscriber premises. Subscriber premises 121–123 transmit and receive via fixed, externally-mounted antennas 131–133, respectively. Subscriber premises 121–123 may comprise many different types of residential and commercial buildings, including single family homes, multi-tenant offices, small business enterprises (SBE), medium business enterprises (MBE), and so-called "SOHO" (small office/home office) premises.

The transceiver base stations, including transceiver base station 110, receive the forward channel (i.e., downlink) signals from external network 150 and transmit the reverse channel (i.e., uplink) signals to external network 150. External network 150 may be, for example, the public switched telephone network (PSTN) or one or more data networks, including the Internet or proprietary Internet protocol (IP) wide area networks (WANs) and local area networks (LANs). Exemplary transceiver base station 110 is coupled to RF modem shelf 140, which, among other things, up-converts baseband data traffic received from external network 150 to RF signals transmitted in the forward channel to subscriber premises 121–123. RF modem shelf 140 also down-converts RF signals received in the reverse channel from subscriber premises 121–123 to baseband data traffic that is transmitted to external network 150.

RF modem shelf 140 comprises a plurality of RF modems capable of modulating (i.e., up-converting) the baseband data traffic and demodulating (i.e., down-converting) the reverse channel RF signals. In an exemplary embodiment of the present invention, each of the transceiver base stations covers a cell site area that is divided into a plurality of sectors. In an advantageous embodiment of the present invention, each of the RF modems in RF modem shelf 140 may be assigned to modulate and demodulate signals in a particular sector of each cell site. By way of example, the cell site associated with transceiver base station 110 may be partitioned into six sectors and RF modem shelf 140 may comprise six primary RF modems (and, optionally, a seventh spare RF modem), each of which is assigned to one of the six sectors in the cell site of transceiver base station 110. In another advantageous embodiment of the present invention, each RF modem in RF modem shelf 140 comprises two or more RF modem transceivers which may be assigned to at least one of the sectors in the cell site. For example, the cell site associated with transceiver base station 110 may be partitioned into six sectors and RF modem shelf 140 may comprise twelve RF transceivers that are assigned in pairs to each one of the six sectors. The RF modems in each RF modem pair may alternate modulating and demodulating the downlink and uplink signals in each sector.

RF modem shelf 140 is located proximate transceiver base station 110 in order to minimize RF losses in communication line 169. RF modem shelf 140 may receive the baseband data traffic from external network 150 and transmit the baseband data traffic to external network 150 via a number of different paths. In one embodiment of the present invention, RF modem shelf 140 may transmit baseband data traffic to, and receive baseband data traffic from, external network 150 through central office facility 150 via communication lines 166 and 167. In such an embodiment, communication line 167 may be a link in a publicly owned or privately owned backhaul network. In another embodiment of the present invention, RF modem shelf 140 may transmit baseband data traffic to, and receive baseband data traffic from, external network 150 directly via communication line 168 thereby bypassing central office facility 160.

Central office facility 160 comprises access processor shelf 165. Access processor shelf 165 provides a termination of data traffic for one or more RF modem shelves, such as RF modem shelf 140. Access processor shelf 165 also provides termination to the network switched circuit interfaces and/or data packet interfaces of external network 150. One of the principal functions of access processor shelf 165 is to concentrate data traffic as the data traffic is received from external network 150 and is transferred to RF modem shelf 140. Access processor shelf 165 provides data and traffic processing of the physical layer interfaces, protocol conversion, protocol management, and programmable voice and data compression.

It should be noted that network 100 was chosen as a fixed wireless network only for the purposes of simplicity and clarity in explaining a subscriber integrated access device according to the principles of the present invention. The choice of a fixed wireless network should not be construed in any manner that limits the scope of the present invention in any way. As will be explained below in greater detail, in alternate embodiments of the present invention, a subscriber integrated access device according to the principles of the present invention may be implemented in other types of broadband access systems, including wireline systems (i.e, digital subscriber line (DSL), cable modem, fiber optic, and the like) in which a wireline connected to the subscriber integrated access device carries forward and reverse channel signals.

Figure 2:
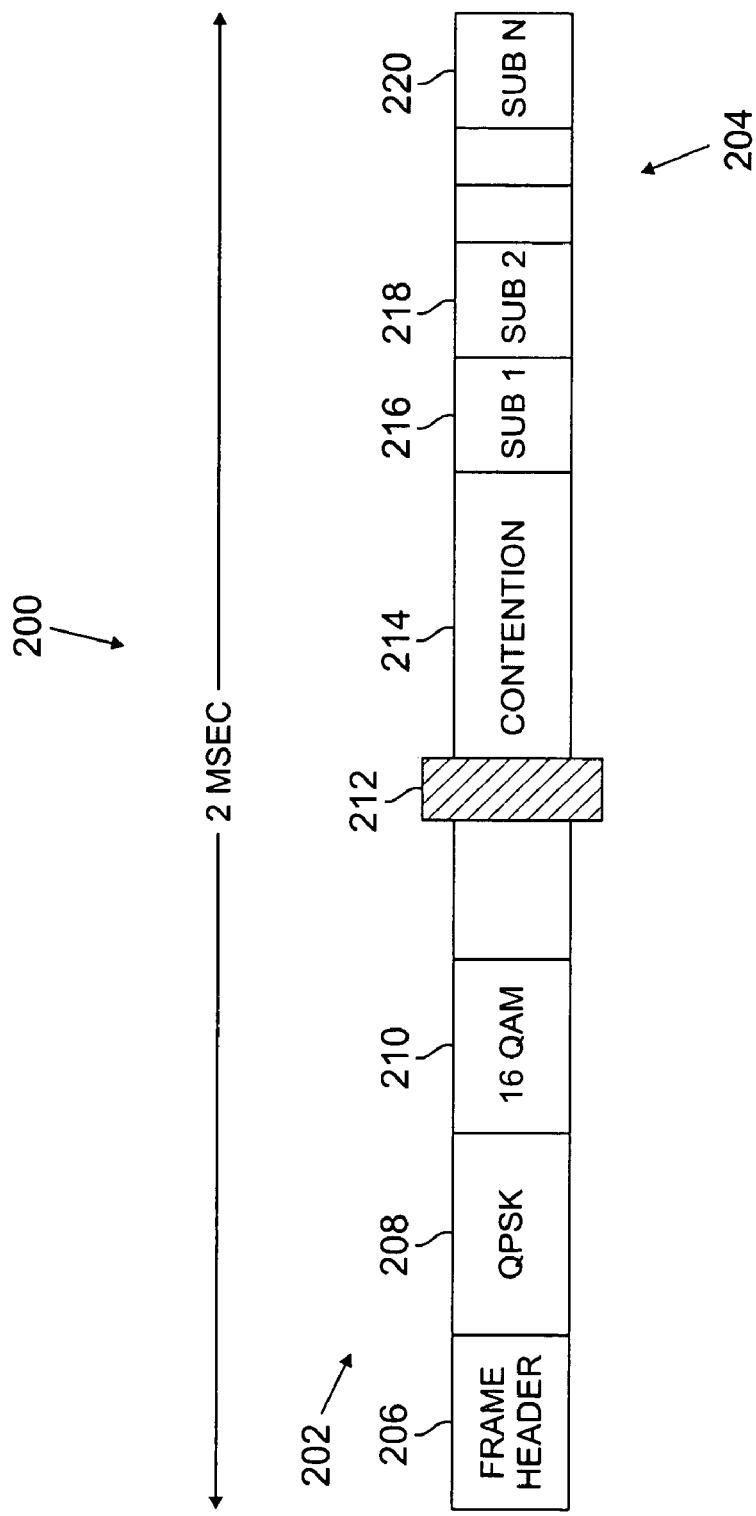
FIG. 2 illustrates an exemplary data frame, as defined by the fixed wireless access network in FIG. 1, according to an embodiment of the present invention.

FIG. 2 illustrates an exemplary data frame as defined by fixed wireless access network 100 according to an embodiment of the present invention. The time division duplex (TDD) data frame 200 is comprised of downlink portion 202 and uplink portion 204 and is propagated along an independent propagation channel, as illustrated in FIG. 1. Downlink portion 202 is comprised of at least frame header 206, modulation segment 208 which signals low complexity modulation, modulation segment 210 which dictates the next highest modulation and contention segment 214. These parameters are managed between both the up link and the down link under control of the basestation RF modem. Boundary 212 is a variable boundary between the uplink and downlink and system monitors and optimize these parameters adaptively and continuously by monitoring the received signal quality optimizing the operating parameters to increase the data throughput. Though only two levels of modulation are indicated in FIG. 2 for ease of explanation, the number of modulations of increasing complexity is arbitrary and may be dictated by the conditions imposed by the system and/or operator.

Unlike the downlink, where each subscriber receives only the base station signal, the base station receives a burst of data on a demand basis from the subscribers on the uplink and the base station has to process each channel. As shown in FIG. 1, the system includes multiple modems connected to access processor 165 for covering the subscribers associated with each base station. Uplink portion 204 of data frame 200 is received by a base station modem and comprises multiple segments: contention period 214 at which access is given to the subscriber stations to communicate the data bursts of uplink data, modulation level, forward Error Correction (FEC) and power level designation from antenna (1) 216, modulation level, forward Error Correction (FEC) and power level designation from antenna (2) 218, and modulation level, forward Error Correction (FEC) and power level designation from antenna (n) 220, where n is the number of antennas transmitting from a subscriber premises.

Figure 3:
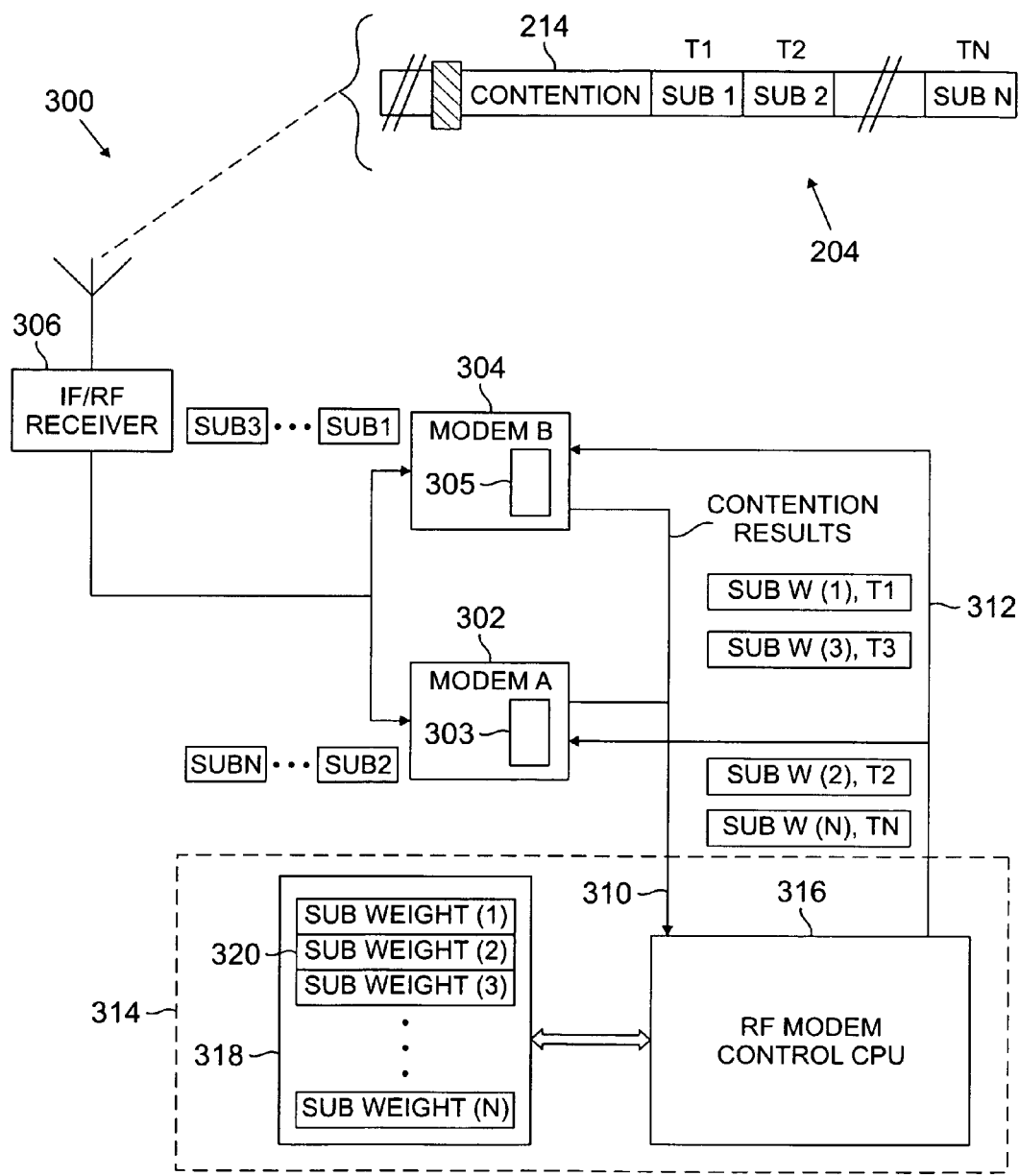
FIG. 3 illustrates a functional block diagram of a portion of the present invention comprising two modems and a controller in an embodiment of the present invention.

FIG. 3 illustrates a functional block diagram of a portion of the present invention comprising two modems and a controller in an embodiment of the present invention. Modem 302 and modem 304 are selectively coupled to receive uplink signals sent by different ones of subscriber stations to the base station (not shown). Here, IF/RF (intermediate frequency/radio frequency) receive circuitry 306 of the base station is shown to pass the uplink signals to the modems. Circuitry 306 is operable to down-convert in frequency uplink signals received from receive circuitry 304. Thereafter, the down-converted signals, bursts sub3 . . . sub1 and bursts subN . . . sub2 are operated upon by modems 304 and 302 respectively. The modems are shown to be functionally coupled to controller 316 via lines 310, for receiving contention results, and 312 for passing parameters, frame times and weight values for the modems to apply to the received signals. Controller 314 includes control CPU 316 and memory device 318.

Control CPU 316 is operable, amongst other things, to perform queue management, scheduling operations, as well as to exert control over operation of modems 302 and 304. Profiles (not shown) are created and maintained by controller 314 in a memory such as memory device 318. The profiles include values which represent channel characteristics upon which uplink signals are transmitted as well as characteristics of the uplink signals. The profiles are stored at memory device 318 and are updated as conditions warrant.

Modem 302 includes equalizer 303 which performs equalization functions, and modem 304 includes equalizer 305, also operable to perform equalization functions. The profiles associated with the various communication channels stored at memory device 318 include weighting values 320 by which to weight equalizers 303 and 305. Values 320 are utilizes to weight equalizers 303 or 305, as appropriate, when data signals sent to the base station on the corresponding channel are to be operated upon by the selected modem. As channel conditions change, changes to values 318 are calculated and stored. Other values of the profiles, while not separately shown, are analogously stored at memory device 318.

Because changes in the channel condition typically vary at a rate much slower than the rate of data transmission of the uplink data signals, the update rates at which the values of the profiles need to be applied to the modems are a mere fraction of the data transmission rates. For instance, fading rates are typically of a level of approximately 1 to 2 Hz while frame updates of the frames are on the order of approximately 500 Hz. Updates are typically needed at approximately five to ten times the channel rate, i.e. of about 5 to 20 Hz. The updates are common in one implementation are made in conjunction with a status polling mechanism. Additionally, a demand access mechanism permits scheduling of traffic bursts, i.e., bursts of uplink signals that may be anticipated to arrive from a particular subscriber station. A demand access burst within contention period portion 214 of uplink portion 204 of a frame is of a relatively brief duration and utilizes relatively robust FEC and modulation short orthogonalization codes when utilizing a spread spectrum arrangement. The modem at which the burst of the uplink data signal is to be operated cyclically adapts equalization functions performed by the equalizer.

Figure 4:
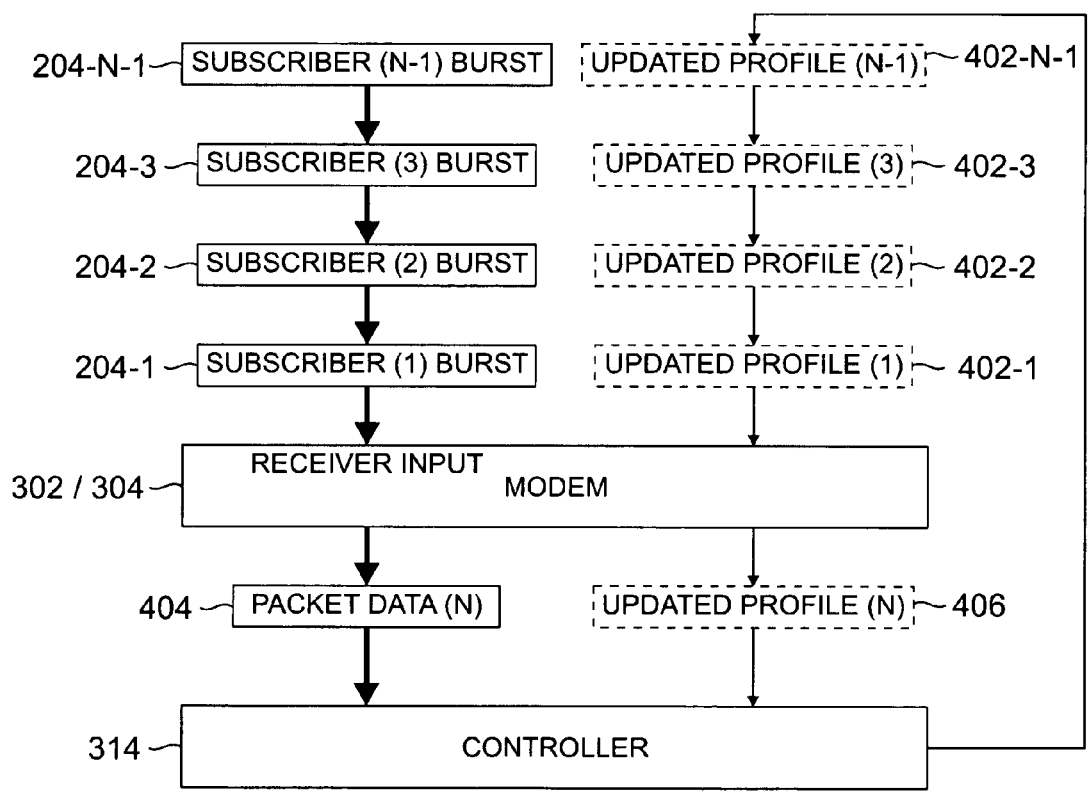
FIG. 4 illustrates a high-level block diagram of the controller and one modem in the base station of FIG. 2 in an embodiment of the present invention.

FIG. 4 illustrates a high-level block diagram of the controller and one modem in the base station of FIG. 2 in an embodiment of the present invention. Uplink data signal bursts transmitted to the base station by various subscriber stations are represented by the blocks 204-1 through 204-N–1. As a burst of data transmitted by selected subscriber station is applied to modem 302 and 304, a corresponding profile is retrieved from the memory device of the controller and applied to modem 302 or 304. The profiles are represented in the figure by the blocks 402-1 through 402-N–1.

The demodulator portion of modem 302 or 304 operates upon the burst of data received and a resultant packet of data, here represented by the block 404, is generated in which, amongst other things, the values of the data packet have been compensated for the effects of distortion generate thereon.

Updates are made to the profile as appropriate (indicated by block 406) and the updated profile is stored at the memory device of the controller. When subsequent bursts generated by the same subscriber station are received at the base station and applied to the modem, the updated profile is retrieved and utilized when the subsequent burst of data is to be operated upon by the modem. Compensation for distortion introduced on the uplink data signal is improved because the profile was updated as the data signal's channel conditions changed.

Cyclo-stationary adaptive filtering (CSAF) is performed upon the uplink data burst signal. CSAF is a signal processing technique to allow adaptive filters to operate in environments that exhibit cyclic/deterministic channel environments. Each burst of the data signal transmitted by a subscriber station forms a separate and distinct stationary channel environment. Each of the channels is processed by configuring the receive portion of the base station with a matched filter forming the equalizer, such as equalizers 303 and 305 (shown in FIG. 3) for the specific channel. The values forming the profiles stored at the memory device of the controller are used to weight the equalizer, as appropriate.

In an exemplary implementation, two separate modems are utilized to demodulate separate bursts of uplink data signals. By utilizing at least two separate modems, alternating ones of the modems are utilized to demodulate successive bursts of data. During a time period in which a demodulator is not being utilized to operate upon a data burst, values associated with another channel upon which a subsequent data burst is expected to be transmitted is applied to the unused modem. Thereby, when the subsequent burst of data is received at the base station the modem is primed to operate upon the burst of the uplink data signal.

In another implementation, different types of modems operable upon different types of signals form the separate modems. When a signal generated by a subscriber station is received at the base station, the signal burst is applied to the modem which is capable of operating upon the particular signal. Modem-types are upgradeable while maintaining the backward compatibility of the base station. Additional modems are added, as needed, thereby to permit continued operation of the base station as new types of technology are made available.

Profile values, for example, include: weighting values for the equalizers in the time domain or transformed weights in the frequency domain; the modulation index of the uplink data signal, the modulation orthogonalization; parameters associated with forward error correction of the uplink data signal, antenna combining parameters when antenna diversity and/or beam-forming is utilized, and residual carrier or baud timing adjustments.

Thereby, through operation of an embodiment of the present invention, a manner is provided by which to operate upon data signals received at a receiving station, such as a base station of a fixed wireless access communication system. The distortion introduced upon the data signals during their communication upon non-ideal communication channels is better compensated for, thereby permitting improved quality of communications as well as increased throughput rates to increase the capacity of the communication system.

The previous descriptions are of preferred examples for implementing the invention, and the scope of the invention should not necessarily be limited by this description. The scope of the present invention is defined by the following claims.

What is claimed is:

1. An apparatus for a communication station operable in a wireless communication system at least to receive first and second data signals successively transmitted thereto by a first subscriber station and a second subscriber station, respectively, within a plurality of subscriber stations, the apparatus comprising:

a first demodulator selectably coupled to receive the first data signals transmitted to the communication station;

at least a second demodulator also selectably coupled to receive the second data signals transmitted to the communication station; and a controller, coupled to the first demodulator and to the at least second demodulator in a feedback arrangement, the controller alternately selecting the first data signals for application to the first demodulator and the second data signals for application to the second demodulator, wherein the at least the second subscriber station comprises a plurality of subscriber stations and wherein the controller selectively applies the first and second data signals to the first and second demodulators according to a selected pattern by alternately coupling the first demodulator and the second demodulator to receive, selectably, the first and at least second data signals communicated by alternating ones of the plurality of subscriber stations.

2. The apparatus of claim 1 wherein the wireless communication system comprises a fixed wireless access system, wherein the communication station comprises a base station of the fixed wireless access system in which the data signals transmitted thereto by the first subscriber station comprise first uplink burst data signals and the data signals transmitted thereto by the second subscriber station comprise second uplink burst data signals, the first demodulator embodied at a first modem.

3. The apparatus of claim 2 wherein the second demodulator is embodied at a second modem.

4. An apparatus for a communication station operable in a wireless communication system at least to receive first and second data signals successively transmitted thereto by a first subscriber station a second subscriber station, respectively, within a plurality of subscriber stations, the apparatus comprising:
   a first demodulator selectably coupled to receive the first data signals transmitted to the communication station;
   at least a second demodulator also selectably coupled to receive the second data signals transmitted to the communication station; and
   a controller, coupled to the first demodulator and to the at least second demodulator in a feedback arrangement, the controller alternately selecting the first data signals for application to the first demodulator and the second data signals for application to the second demodulator, wherein the first and at least second data signals transmitted to the communication station by the first and at least second subscriber stations are transmitted in bursts of selected time durations and wherein the controller further determines times of arrival and time directions of the bursts which form the data signals,
   wherein the at least the second subscriber station comprises a plurality of subscriber stations and wherein said controller selectively applies the first and second data signals to the first and second demodulators according to a selected pattern by alternately coupling the first demodulator and the second demodulator to receive, selectably, the first and at least second data signals communicated by alternating ones of the plurality of subscriber stations.

5. Apparatus for a communication station operable in a wireless communication system at least to receive first and second data signals successively transmitted thereto by a first subscriber station and a second subscriber station, respectively, within a plurality of subscriber stations, the apparatus comprising:
   a first demodulator selectably coupled to receive the first data signals transmitted to the communication station;
   at least a second demodulator also selectably coupled to receive the second data signals transmitted to the communication station; and
   a controller, coupled to the first demodulator and to the at least second demodulator in a feedback arrangement, the controller alternately selecting the first data signal for application to the first demodulator and the second data signal for application to the second demodulator, wherein the controller further comprises a memory portion, the controller further for maintaining profiles associated with each of the first and at least second data signals transmitted upon first and at least second channels, respectively, the profiles stored at the memory portion of the controller.

6. The apparatus of claim 5 wherein the profiles maintained at the memory portion of the controller comprise at least one channel-related parameter associated with the first and at least second channels upon which the first and at least second data signals are communicated, respectively.

7. The apparatus of claim 6 wherein the first demodulator and the second demodulator each include equalizer portions for equalizing the at least one of the first and second data signals selectably applied to the first demodulator and the second demodulator, respectively.

8. The apparatus of claim 7 wherein filter weight values form portions of the profiles maintained by the controller and stored at the memory portion thereof.

9. The apparatus in claim 5 wherein the profiles maintained at the memory portion of the controller comprise at least one signal-related parameter associated with the first and at least second data signals, respectively.

10. The apparatus of claim 9 wherein the first and at least second data signals are characterized by modulation indexes, and wherein values of the modulation indexes form portions of the profiles maintained by the controller and stored at the memory portion of the controller.

11. The apparatus of claim 9 wherein the first and at least second data signals are characterized by modulation orthogonalizations and wherein values of the modulation orthogonalizations form portions of the profiles maintained by the controller and stored at the memory portion of the controller.

12. The apparatus of claim 9 wherein the first and at least second data signals include FEC (forward error correction), the FEC characterized by FEC parameters and wherein values of the FEC parameters form portions of the profiles maintained by the controller and stored at the memory portion of the controller.

13. The apparatus of claim 5 wherein the communication station to which the first and at least second data signals are transmitted by the first ant at least second subscriber stations, respectively, exhibits antenna diversity provided by a first antenna transducer and at least a second antenna transducer, the first and at least second data signals transduced by the first and at least second antenna transducer, respectively, combined utilizing antenna combining parameters, and wherein the antenna combining parameters form portions of the profiles maintained by the controller and stored at the memory portion of the controller.

14. The apparatus of claim 5 wherein profiles maintained by the controller and stored at the memory portion thereof comprise values of Band timing adjustments by which to adjust the first and at least second data signals.

15. The apparatus of claim 5 wherein profiles maintained by the controller and stored at the memory portion thereof comprise values of residual carrier adjustments by which to adjust the first and at least second data signals.

16. A method for acting upon first and second successive data signals transmitted to a communication station operable in a wireless communication system by a first subscriber station and at least a second subscriber station, the method comprising:
   selecting at which of a first demodulator and at least a second demodulator to apply at least one of the first data signals and the second data signals, wherein the first and second successive data signals and any subsequent data signals are alternately applied to the first and second demodulators;

demodulating the at least one of the first and at least second data signals at the first demodulator when the first demodulator is selected during the operation of selecting; and demodulating the at least one of the first and at least second data signals at the second demodulator when the second demodulator is selected during the operation of selecting; and maintaining profiles associated with each of the first and at least second data signals transmitted upon the first and at least second channels, respectively, and wherein the operations of demodulating further comprise accessing the profiles.

17. The method of claim 16 wherein selections made during the operation of selecting are made according to a selected pattern.

* * * * *